(12) United States Patent
Richard et al.

(10) Patent No.: US 11,226,045 B1
(45) Date of Patent: Jan. 18, 2022

(54) DEBRIS TOLERANT VALVE

(71) Applicant: United States of America as represented by the Administrator of NASA, Washington, DC (US)

(72) Inventors: James A. Richard, Grant, AL (US); Christopher T. Griffith, Decatur, AL (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 187 days.

(21) Appl. No.: 16/692,857

(22) Filed: Nov. 22, 2019

(51) Int. Cl.
*F16K 11/02* (2006.01)
*F16K 31/40* (2006.01)
*F16K 31/04* (2006.01)
*F16K 15/14* (2006.01)

(52) U.S. Cl.
CPC ............ *F16K 11/02* (2013.01); *F16K 15/144* (2013.01); *F16K 31/046* (2013.01); *F16K 31/40* (2013.01)

(58) Field of Classification Search
CPC ..... Y10T 137/86533; Y10T 137/86541; Y10T 137/86566; Y10T 137/86638; Y10T 137/86646; Y10T 137/86759; Y10T 137/86767; Y10T 137/86871; Y10T 137/86863; F16K 11/0876; F16K 11/02; F16K 15/144; F16K 31/046; F16K 31/00
See application file for complete search history.

(56) References Cited

U.S. PATENT DOCUMENTS

| | | | | |
|---|---|---|---|---|
| 2,558,260 A | * | 6/1951 | Maky | F16K 11/0876 251/174 |
| 3,063,467 A | * | 11/1962 | Roberts, Jr. | F16K 1/425 137/516.29 |
| 3,464,449 A | * | 9/1969 | Morton | F16K 24/02 137/625.24 |
| 3,700,006 A | * | 10/1972 | Marcillaud | F16K 11/0873 137/625.21 |
| 3,742,983 A | * | 7/1973 | Harter | F16K 5/04 137/625.47 |
| 4,441,524 A | * | 4/1984 | Mese | F16K 5/0689 137/625.47 |

(Continued)

FOREIGN PATENT DOCUMENTS

| | | |
|---|---|---|
| AU | 2015202174 A1 | 11/2015 |
| GB | 2544872 A | 5/2017 |

*Primary Examiner* — Jessica Cahill
(74) *Attorney, Agent, or Firm* — James J. McGroary; Helen M. Galus

(57) ABSTRACT

A valve includes a valve body, a sleeve within the valve body and a rotatable valve element that has one portion within the sleeve to control flow of media through the valve and another portion extending from the valve body and coupled to an actuator that rotates the valve element. The valve element is rotatable to a first position to flow media to one port and to a second position to flow media to another port. The sleeve has a pair of side openings. Each side opening has an angled perimetrical edge and is aligned with a corresponding port member. A half dovetail shaped groove is formed by the angled perimetrical edge of each side opening, the corresponding port and the valve body. A seal is lodged within each groove to form a seal that exhibits reduced unswept volume and which wipes debris off the valve element as it rotates.

20 Claims, 11 Drawing Sheets

(56) References Cited

U.S. PATENT DOCUMENTS

| | | | | |
|---|---|---|---|---|
| 4,478,251 | A | * | 10/1984 | Sanchez ............... F16K 3/0227 |
| | | | | 138/44 |
| 4,633,907 | A | * | 1/1987 | Adams .................. B62D 5/083 |
| | | | | 137/625.22 |
| 4,681,133 | A | * | 7/1987 | Weston .................. E21B 29/04 |
| | | | | 137/315.18 |
| 4,968,334 | A | | 11/1990 | Hilton |
| 5,038,724 | A | | 8/1991 | Neal et al. |
| 5,785,074 | A | * | 7/1998 | Kieper ................. F16K 5/0605 |
| | | | | 137/312 |
| 5,899,232 | A | * | 5/1999 | Cardoso ............... F16K 11/048 |
| | | | | 137/625.5 |
| 5,988,220 | A | * | 11/1999 | Sakaki ................ F16K 11/0876 |
| | | | | 137/625.22 |
| 6,161,582 | A | * | 12/2000 | Asano .................. F16K 5/0605 |
| | | | | 137/625.21 |
| 6,926,032 | B2 | | 8/2005 | Nawaz |
| 6,957,801 | B2 | | 10/2005 | Wilfert et al. |
| 7,997,293 | B2 | | 8/2011 | Ruschke |
| 8,360,250 | B2 | | 1/2013 | Nguyen et al. |
| 9,647,379 | B2 | | 5/2017 | Townsend, III et al. |
| 10,012,325 | B2 | * | 7/2018 | Bohaychuk ............. E21B 34/02 |
| 10,047,883 | B2 | * | 8/2018 | Mammen ............ F16L 19/0218 |
| 10,465,806 | B2 | * | 11/2019 | Feng .................... F16K 5/0605 |
| 10,774,828 | B1 | * | 9/2020 | Smith ................. F04B 53/1087 |
| 2006/0249590 | A1 | * | 11/2006 | Dulin .................. G05D 23/021 |
| | | | | 236/93 R |
| 2020/0088308 | A1 | * | 3/2020 | Ozeki .................... F01P 7/165 |

\* cited by examiner

DEBRIS TOLERANT VALVE

ORIGIN OF THE INVENTION

The invention described herein was made in the performance of work under a NASA contract and by an employee of the United States Government and is subject to the provisions of Section 20135(b) of the National Aeronautics and Space Act, Public Law 111-314, § 3 (124 Stat. 3330, 51 U.S.C. Chapter 201), and may be manufactured and used by or for the Government for governmental purposes without the payment of any royalties thereon or therefore.

CROSS-REFERENCES TO RELATED PATENT APPLICATIONS

None.

FIELD OF THE INVENTION

The present invention relates to a debris tolerant valve.

BACKGROUND

Systems that require desiccants, dryers, catalysts or other dry pelletized media typically produce dust, debris and airborne particles, known as foreign object debris or "FOD". Such FOD may be picked up by process fluids and consequently, carried throughout the valve and conduit networks. For example, the International Space Station (ISS) utilizes a Carbon Dioxide Removal Assembly (CDRA) that uses clay pellets with embedded zeolite crystals. These pellets rub together and breakdown resulting in the release of clay and zeolite FOD into the selector valves used to control the process. Valves that are subjected or exposed to FOD typically have limited operational lifespans because such dust and debris, damages the seals, bearings and other internal valve components. Prior art valves typically have large internal volumes that are not in the path of the fluid or other medium. Such large internal volumes are referred to as "unswept" volumes and are typically where FOD accumulates. One such prior art valve having large unswept volumes is a ball valve which utilizes a spherical ball fitted into cylindrical bores within the valve body. However, the ball valve configuration results in a large unswept volumes wherein FOD will accumulate. Prior art valves also typically use plastic seals for the seats. Such plastic seals are typically Teflon or Teflon based. However, as FOD moves across the seal areas, the plastic seals become torn and ripped. This degradation of the plastic seals results in leaks and valve failure. Another disadvantage of prior art valves is that the internal movable element (e.g. spherical ball) that directs flow of medium to different valve ports typically rotates 90° or 180° in one direction to one valve port and then returns to the previous valve port by rotating 90° or 180° in the opposite direction. However, the back and forth action of the internal movable element tends to grind the FOD into the valve seals and accelerates wear and tear of the seals. Furthermore, many prior art valves have bearings and sliding or rotating parts that are directly in the path of media flowing through the valve resulting in these bearings and moving parts becoming clogged with FOD.

What is needed is a debris tolerant valve that addresses the aforementioned problems and deficiencies of prior art valves.

SUMMARY OF THE INVENTION

In some embodiments, the present invention is directed to a valve assembly comprising a valve body comprising an interior region, an interior surface extending about the interior region and a pair of valve body outlets in communication with the interior region. Each valve body outlet has a first diameter. The valve body includes a valve body inlet in communication with the interior region. The valve assembly further comprises a substantially cylindrical sleeve disposed within the interior region of the valve body and secured to the valve body such that the sleeve is stationary. The sleeve comprises a sidewall having a sleeve exterior surface that contacts the interior surface of the valve body and a sleeve interior surface. The sleeve includes pair of open ends and a pair of sleeve sidewall openings. Each sleeve sidewall opening has an angled perimetrical edge and is aligned with a corresponding valve body outlet. Each sleeve sidewall opening has a second diameter that is larger than the first diameter such that a portion of the interior surface of the valve body is adjacent to the angled perimetrical edge of the sleeve sidewall opening. The valve assembly further comprises a pair of ports attached to the valve body. Each port is configured for connection to a corresponding external conduit and includes a generally tubular portion positioned within a corresponding valve body outlet and sleeve sidewall opening. The generally tubular portion of each port, the angled perimetrical edge of the sleeve sidewall opening corresponding to the port and the portion of the interior surface of the valve body that is adjacent to the angled perimetrical edge cooperate to form a groove having a substantially half dovetail shape. A seal is lodged within the groove and is configured so that a portion of the seal extends into the interior region of the sleeve. The valve assembly further comprises a valve element to control the direction of media flow. The valve element comprises a first portion disposed within the interior region of the sleeve and a second portion attached to the first portion and external to the interior region of the valve body. The valve element is rotatable to a first position in which one port is in communication with the valve body inlet and to a second position in which another port is in communication with the valve body inlet. The first portion of the valve element comprises a generally cylindrical portion that has a surface that contacts the portion of the seal that extends into the interior region of the sleeve, whereby the portion of the seal wipes debris and foreign particles off of the surface of the generally cylindrical portion as the valve element rotates.

Certain features and advantages of the present invention have been generally described in this summary section. However, additional features, advantages and embodiments are presented herein or will be apparent to one of ordinary skill of the art in view of the drawings, specification and claims hereof. Accordingly, it should be understood that the scope of the invention shall not be limited by the particular embodiments disclosed in this summary section.

DETAILED DESCRIPTION OF EXEMPLARY EMBODIMENTS OF THE INVENTION

Figure 1:
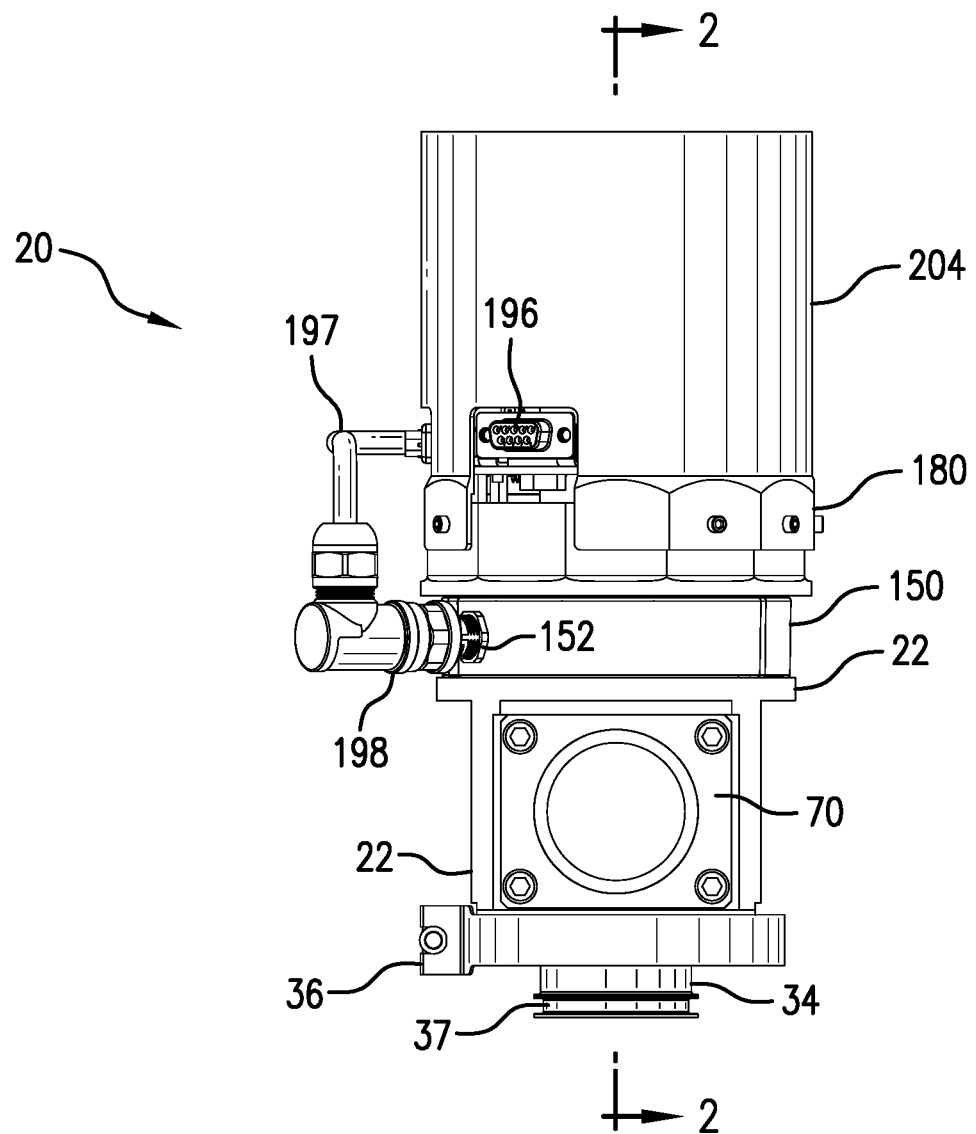
FIG. 1 is a front elevational view of a valve assembly in accordance with an exemplary embodiment of the present invention.

As used herein, the terms "comprises", "comprising", "includes", "including", "has", "having" or any other variation thereof, are intended to cover a non-exclusive inclusion. For example, a process, method, article or apparatus that comprises a list of elements is not necessarily limited to only those elements, but may include other elements not expressly listed or inherent to such process, method, article or apparatus.

Approximating language, as used herein throughout the specification and claims, may be applied to modify any quantitative representation that could permissibly vary without resulting in a change in the basic function to which it is related. Accordingly, a value modified by a term such as "about" or "approximately" is not limited to the precise value specified.

As used herein, the term "FOD" shall refer to foreign object debris (FOD) such as dust and particles of solid matter. FOD may be airborne or contained in a fluid or gas.

As used herein, the term "media" shall mean fluids, air and other gases that may or may not contain FOD.

Referring to FIGS. 1-4, there is shown valve assembly 20 in accordance with an exemplary embodiment of the present invention. Valve assembly 20 comprises valve body 22 which is shown in isolation in FIGS. 7A and 7B. Valve body 22 has upper portion 23, interior region 24, interior surface 26 that extends about interior region 24 and a pair of valve body outlets 28 and 30 which are in communication with interior region 24. Each valve body outlet 28 and 30 has a first diameter. In an exemplary embodiment, valve body outlets 28 and 30 are substantially coaxially aligned. Valve body 22 includes valve body inlet 32 that is in communication with interior region 24. Valve assembly 20 includes common port 34 that is attached to valve body 22 and in communication with valve body inlet 32. Valve body 22 includes flange or lip 35 that circumferentially extends about valve body inlet 32. In an exemplary embodiment, clamp 36 fastens common port 34 to circumferentially extending flange 35. Common port 34 includes portion 37 that is configured to be connected or joined to an external conduit (not shown) that has media flowing therethrough. Valve body 22 is fabricated from a corrosion-resistant metal. Suitable corrosion-resistant metals include, but are not limited to, Aluminum, stainless steel, Titanium or Nickel. In an exemplary embodiment, valve body 22 is fabricated from Aluminum and has a Teflon coating.

Figure 5:
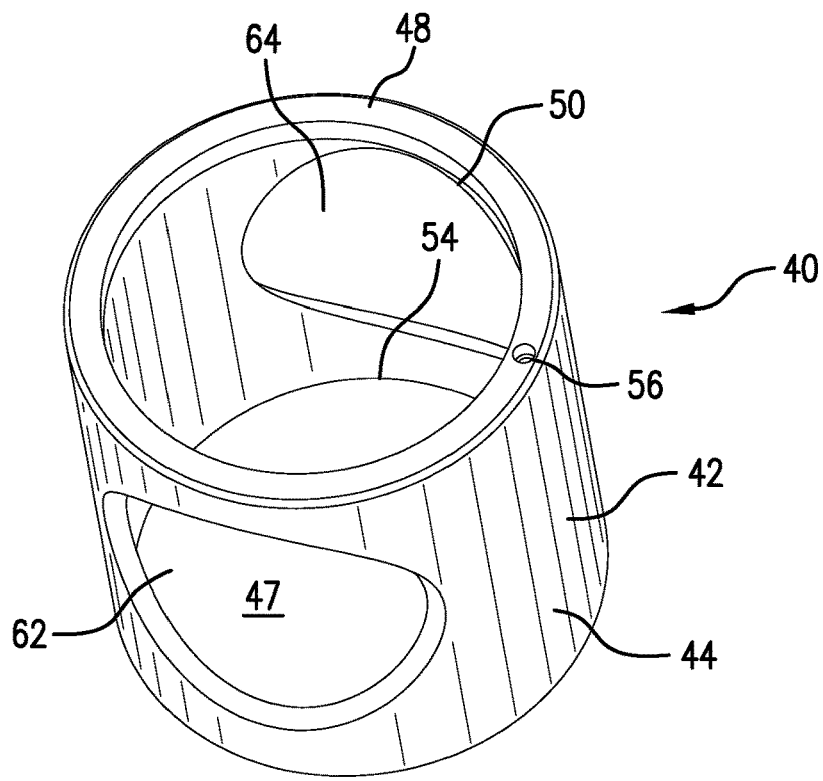
FIG. 5 is a perspective view of a sleeve that is shown in FIG. 2.
Figure 6:
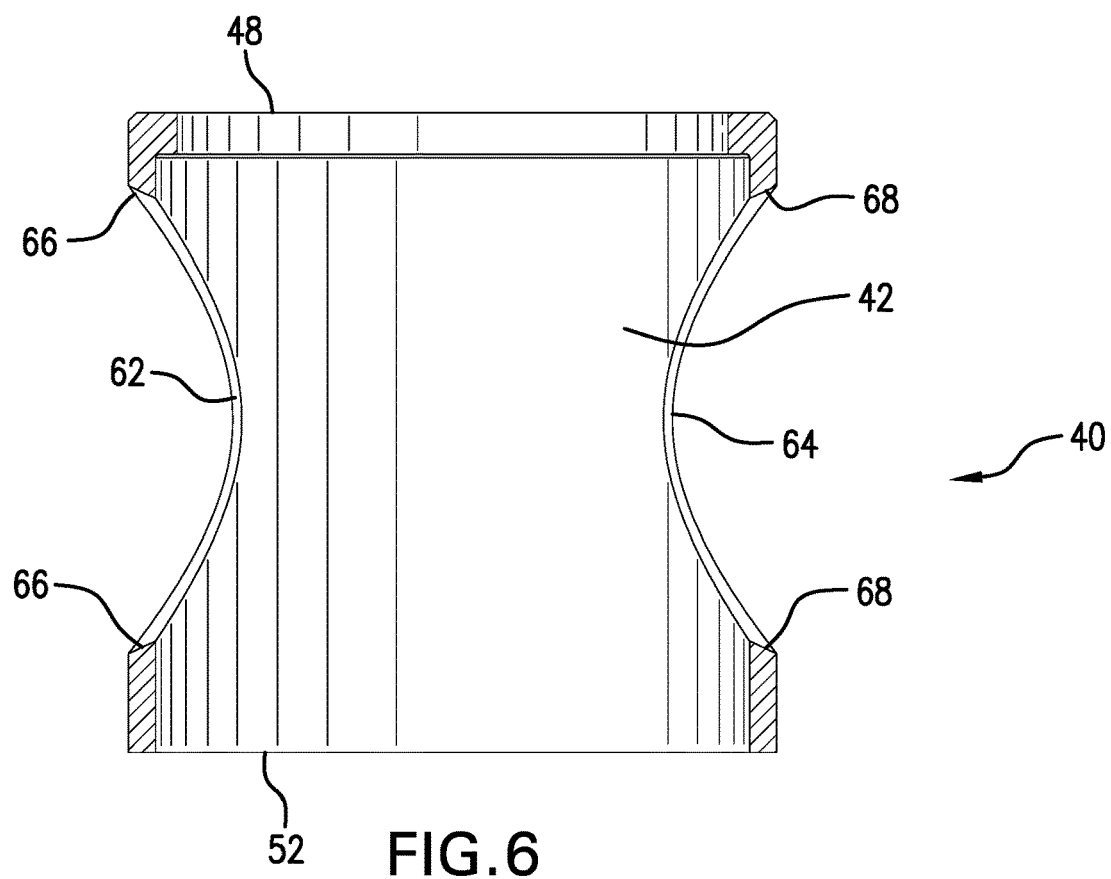
FIG. 6 is a cross-sectional view of the sleeve.
Figure 7A:
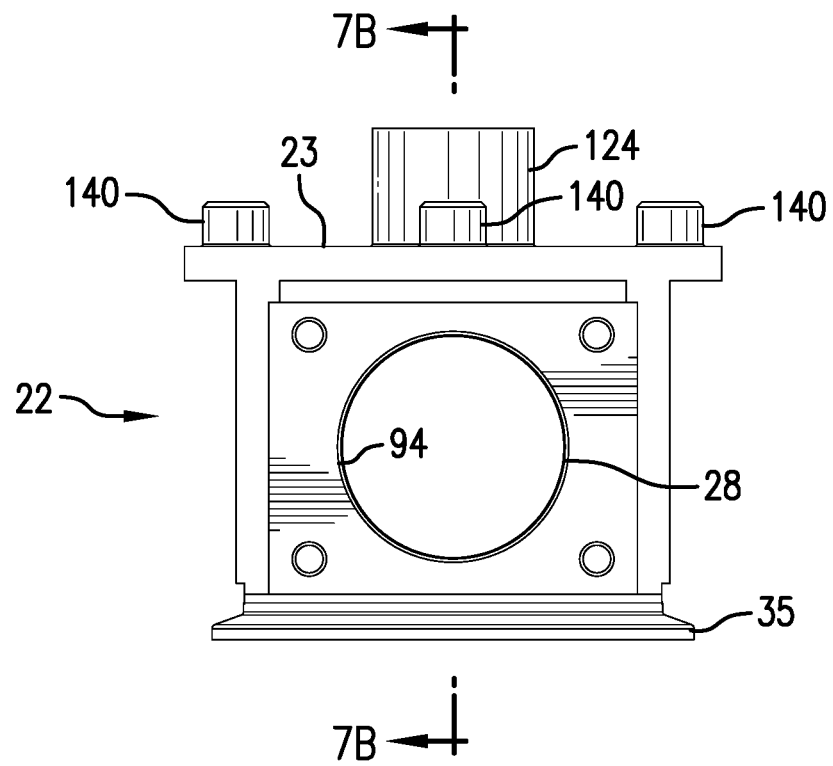
FIG. 7A is a side elevational view of the valve body depicted in FIGS. 1-3.
Figure 7B:
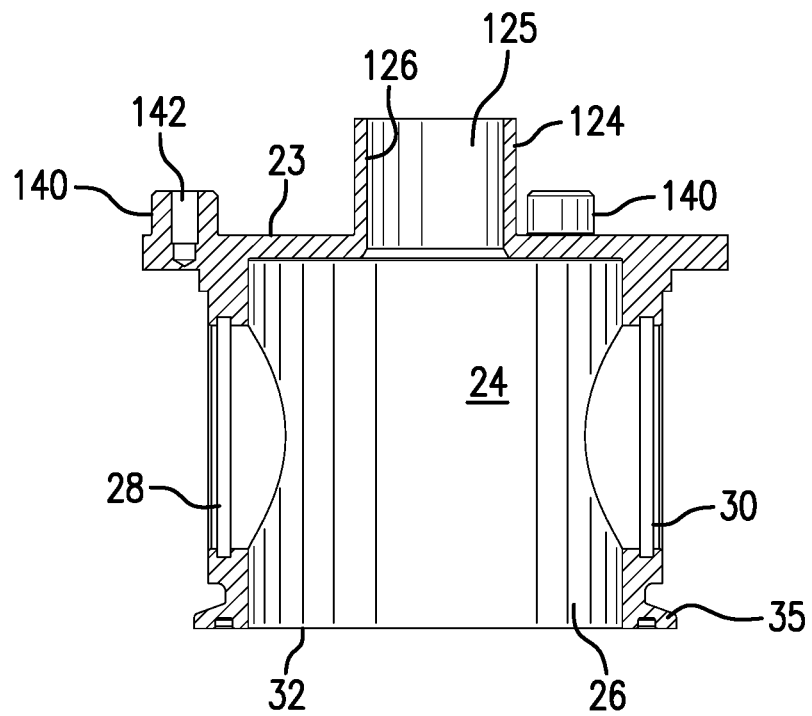
FIG. 7B is a cross-sectional view taken along line 7B-7B of FIG. 7A.
Figure 7C:
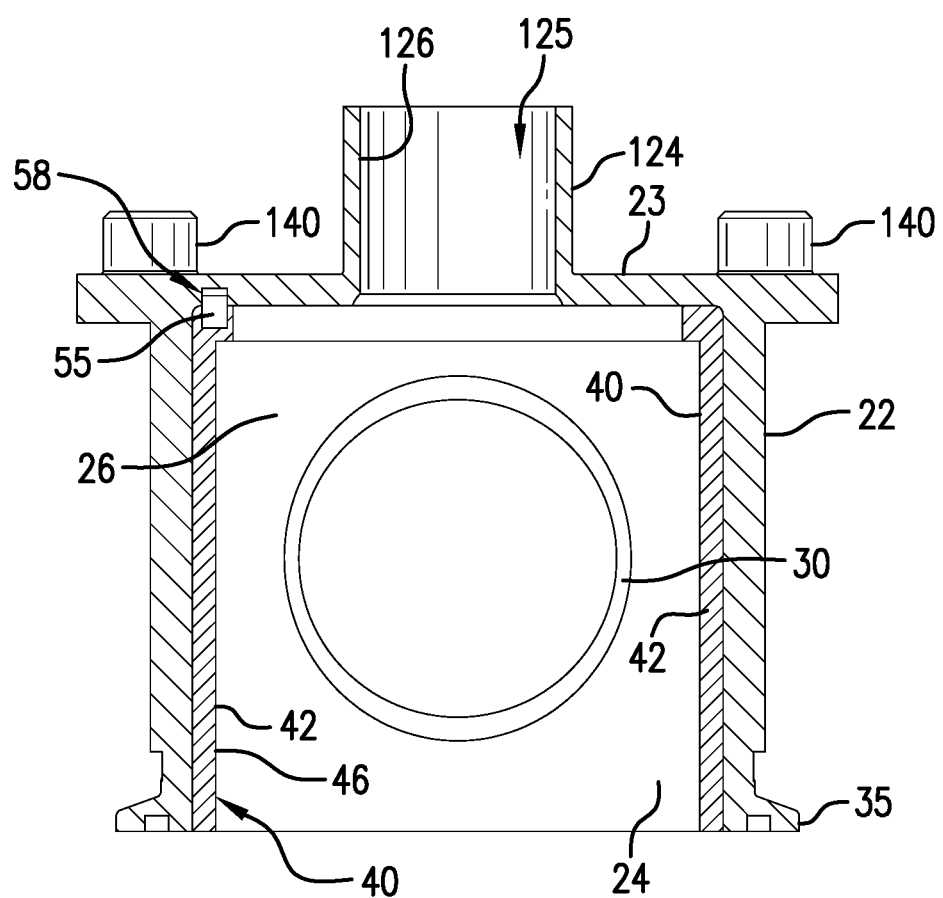
FIG. 7C is a cross-sectional view of the valve body and the sleeve positioned within the valve body.

Referring to FIGS. 2, 5, 6 and 7C, valve assembly 20 further comprises substantially cylindrical sleeve 40 that is disposed within interior region 24 of valve body 20. Sleeve 40 comprises sleeve sidewall 42 that has sleeve exterior surface 44 which contacts interior surface 26 of valve body 22. Sleeve sidewall 42 further includes sleeve interior surface 46. Sleeve 40 includes interior region 47, first end 48 which has opening 50 therein and opposite second end 52 that has opening 54 therein. Sleeve 40 is secured to valve body 20 such that sleeve 40 is stationary. In an exemplary embodiment, dowel pin 55 is disposed within a bore 56 in first end 48 of sleeve 40. In an exemplary embodiment, dowel pin 55 is press-fit into bore 56. When inserting sleeve 40 into interior region 24 of valve body, protruding portion 58 of dowel pin 55 is slip-fitted into a corresponding bore in valve body 22 as shown in FIG. 7C so as to firmly secure sleeve 40 to valve body 22 and prevent any movement of sleeve 40.

Figure 9A:
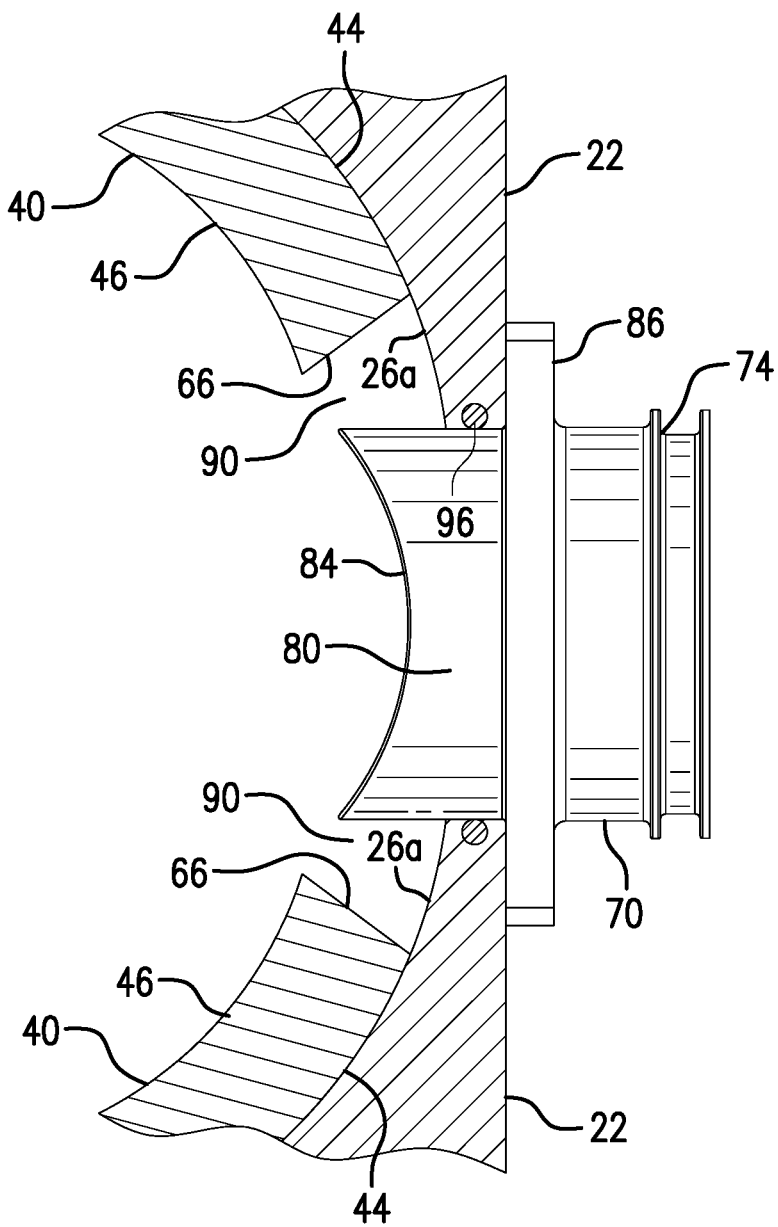
FIG. 9A is a partial, cross-sectional view showing a substantially half dovetail shaped groove formed by portions of the sleeve, the valve body and the port.

As shown in FIGS. 5 and 6, sleeve 40 further includes a pair of sleeve sidewall openings 62 and 64. Each opening 62 and 64 is aligned with a corresponding valve body outlet 28 and 30, respectively. Each opening 62 and 64 has a second diameter that is larger than the first diameter of valve body outlets 28 and 30. Each opening 62 and 64 has an angled perimetrical edge 66 and 68, respectively, as illustrated in FIG. 6. The angle of each angled perimetrical edge 66 and 68 is such that the perimetrical edges 66 and 68 slope toward interior surface 26 of valve body 22. In an exemplary embodiment, each angled perimetrical edge 66 and 68 is configured to have an angle of about 65°. However, it is to be understood that other angles may be suitable as well. The difference between the first diameter of each valve body outlet 28 and 30 and the second diameter of each sleeve sidewall opening 62 and 64 results in a portion of interior surface 26 of valve body 22 being adjacent to each angled perimetrical edge 66 and 68. This is illustrated in FIG. 9A. Interior surface 26 of valve body 22 contacts exterior surface 44 of sleeve 40. Angled perimetrical edge 66 slopes toward interior surface 26. Portion 26A of interior surface 26 is adjacent to angled perimetrical edge 66. Although FIG. 9A illustrates this configuration with respect to sleeve sidewall opening 62 and valve body outlet 28, it is to be understood that the same configuration exists for sleeve sidewall opening 64 and valve body outlet 30. Sleeve 40 is fabricated from a corrosion-resistant metal. Suitable corrosion-resistant metals include, but are not limited to, Aluminum, stainless steel, Titanium and Nickel. In an exemplary embodiment, sleeve 40 is fabricated from Aluminum and is coated with Teflon.

Figure 8A:
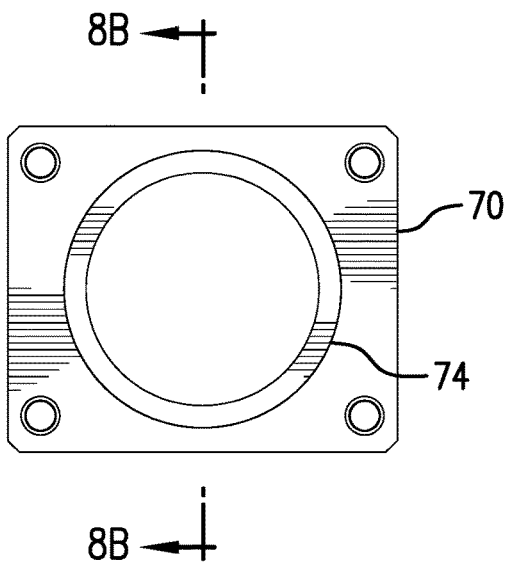
FIG. 8A is a front view of a port shown in FIGS. 1 and 2.
Figure 8B:
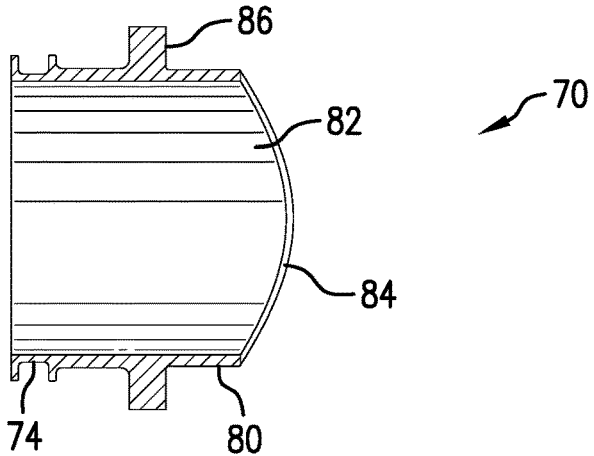
FIG. 8B is a cross-sectional view taken along line 8B-8B of FIG. 8A.
Figure 8C:
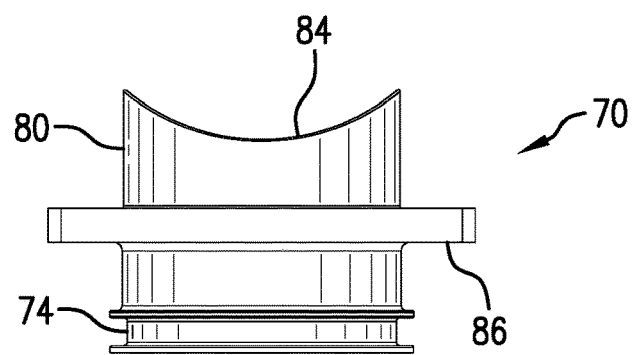
FIG. 8C is a top plan view of the port.
Figure 9B:
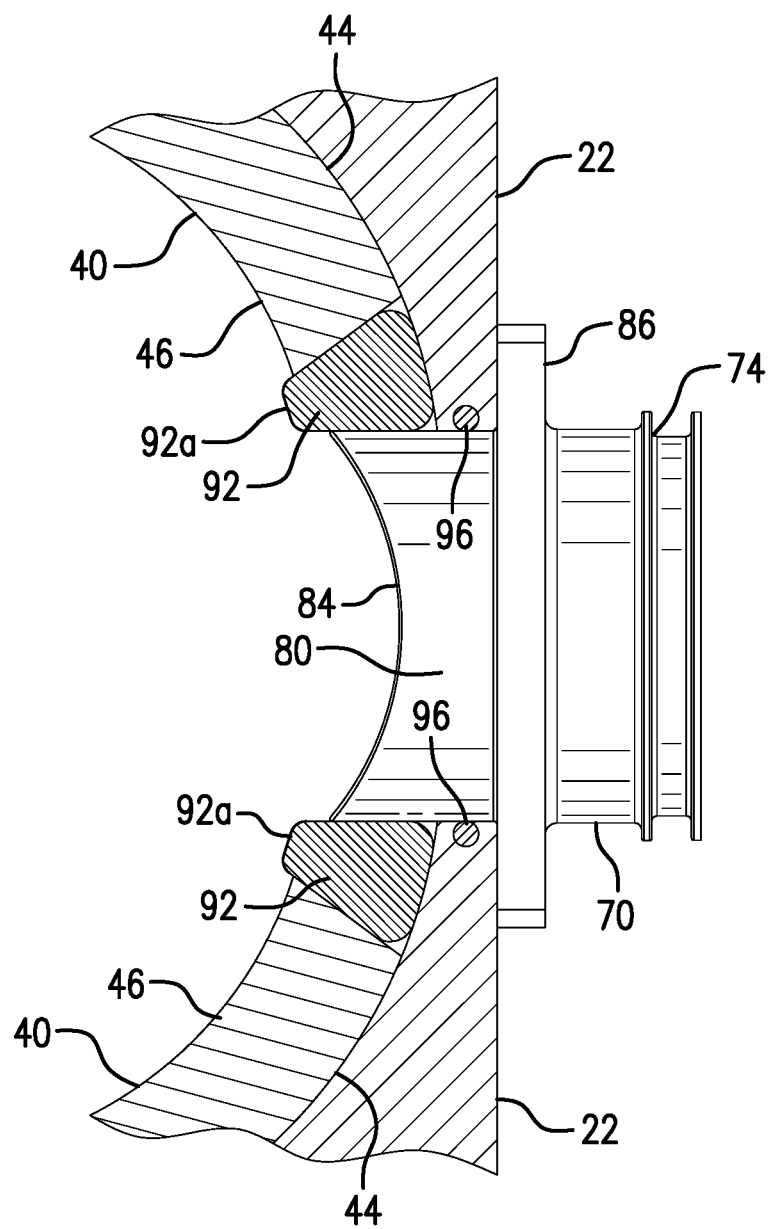
FIG. 9B is a partial, cross-sectional view showing a seal disposed in the substantially half dovetail shaped groove.

As shown in FIGS. 1-4, valve assembly 20 further comprises a pair of ports 70 and 72. In an exemplary embodiment, ports 70 and 72 are removably attached to valve body 22. Ports 70 and 72 include sections 74 and 76, respectively, which are configured for connection to a corresponding external conduit (not shown). Ports 70 and 72 are identical in construction and therefore only port 70 is described in detail. Referring to FIGS. 8A, 8B and 8C, there is shown port 70. Port 70 includes generally tubular portion 80 that has opening 82 and curved end 84 that extends about opening 82. Port 70 includes flanged portion 86. The curvature of curved end 84 corresponds to the curvature of sleeve interior surface 46. Port 70 is attached to valve body 22 such that generally tubular portion 80 is positioned within valve body outlet 28 and sleeve sidewall opening 62 and the curvature of curved end 84 is aligned with the curvature of sleeve interior surface 46. Flanged portion 86 abuts the exterior surface of valve body 22. As shown in FIG. 9A, curved end 84 of generally tubular portion 80, the angled perimetrical edge 66 of sleeve sidewall opening 62 and portion 26A of interior surface 26 of valve body 22 cooperate to form groove 90. Groove 90 has a substantially half dovetail shape. As shown in FIG. 9B, seal 92 is disposed within groove 90 so as to form a seal. In an exemplary embodiment, seal 92 is an elastomeric O-ring seal having a circular cross-section. O-ring seal 92 can be simply pressed into groove 90. Seal 92 is sized and configured to that portion 92A of seal 92 extends into interior region 47 of sleeve 40. Portion 92A functions as a wiper that wipes debris or FOD from the exterior surface of rotatable valve element 100 that is described in the ensuing description.

Each valve body outlet 28 and 30 has a perimetrical edge that defines a groove for receiving a seal. For example, as shown in FIGS. 7A and 9A, valve body outlet 28 has perimetrical edge 94 that has a circumferentially extending groove which is sized for receiving an additional seal 96. Seal 96 creates a seal between perimetrical edge 94 and generally tubular portion 80. In an exemplary embodiment, seal 96 is configured as an elastomeric O-ring seal. Similarly, valve body outlet 30 has a perimetrical edge that defines a groove. A seal is disposed in the groove to create a seal between the perimetrical edge of valve body outlet 30 and the generally tubular portion of port 72.

Figure 2:
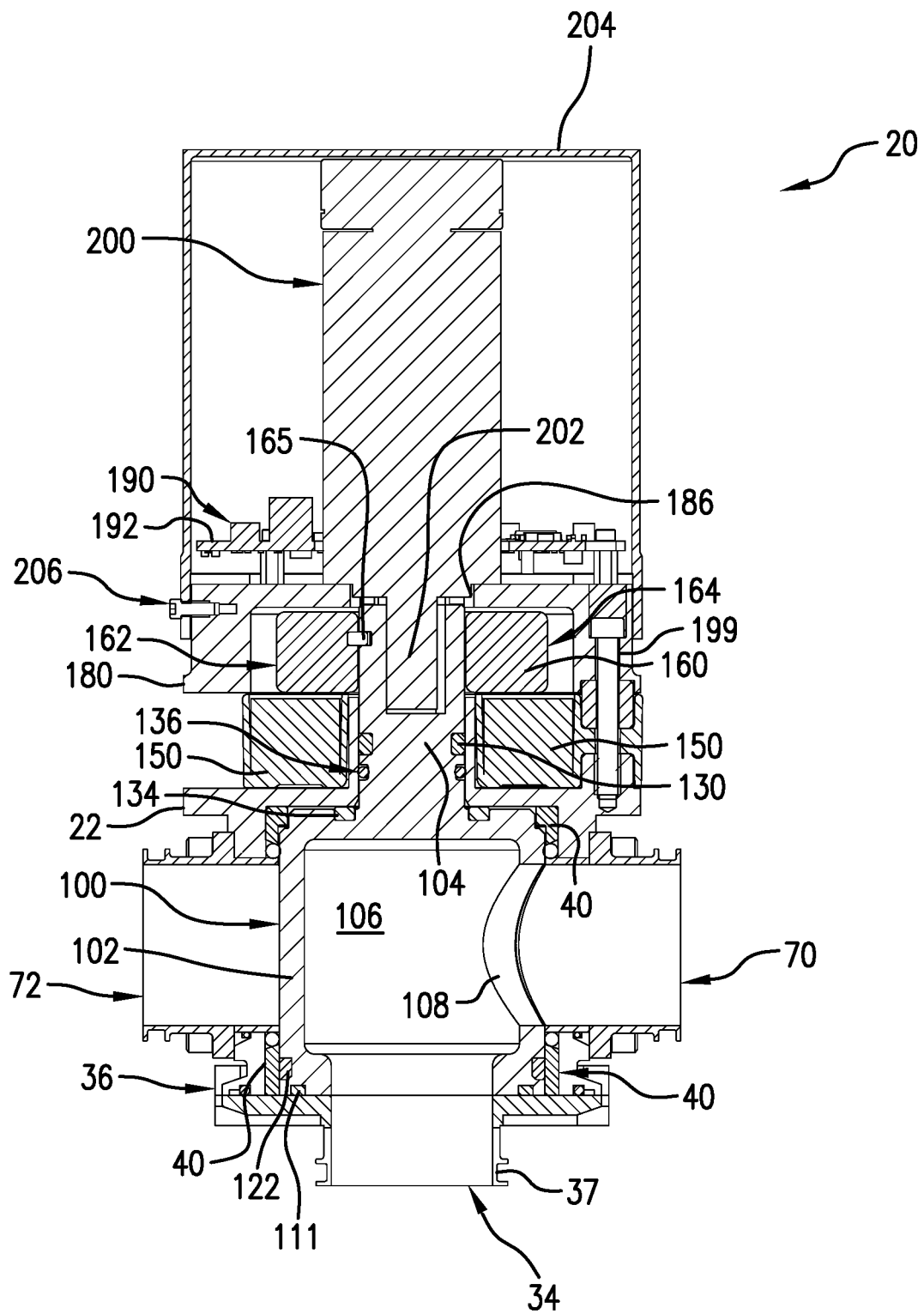
FIG. 2 is a cross-sectional view taken along line 2-2 of FIG. 1.
Figure 3:
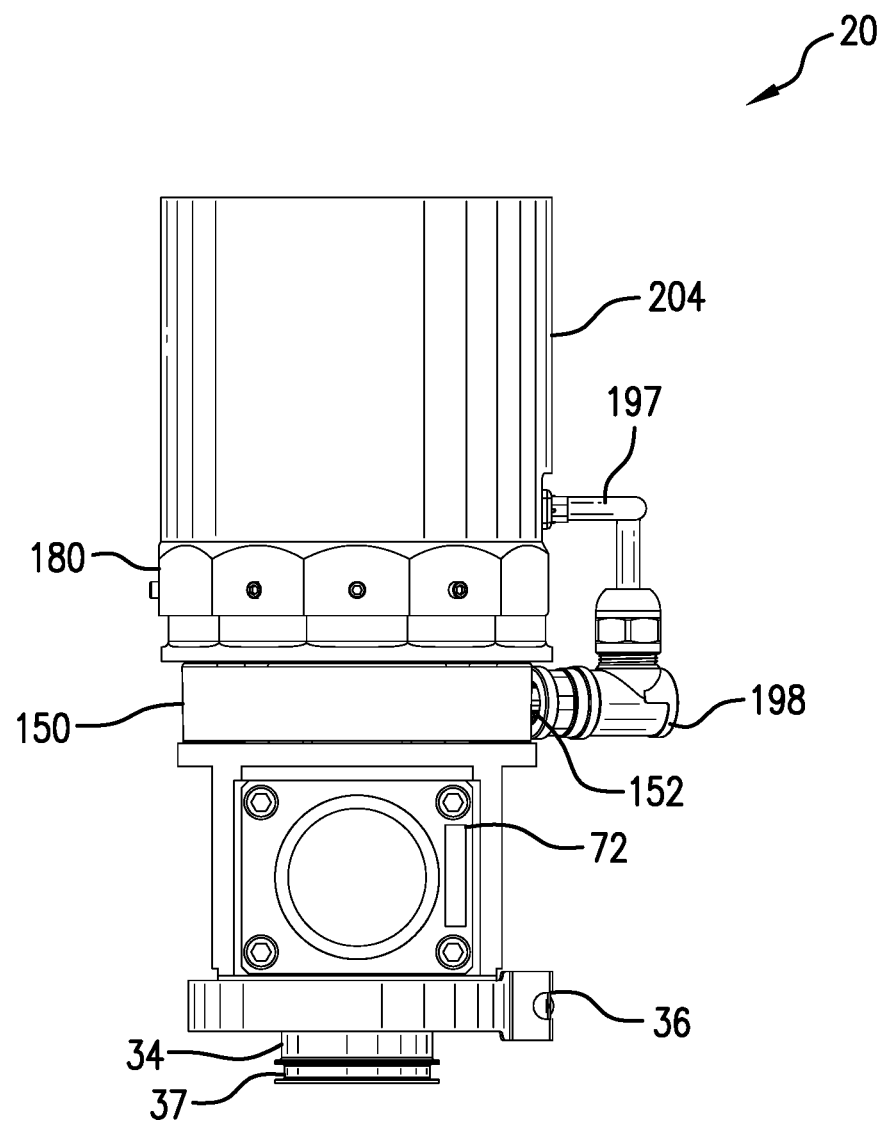
FIG. 3 is a side elevational view of the valve assembly.
Figure 4:
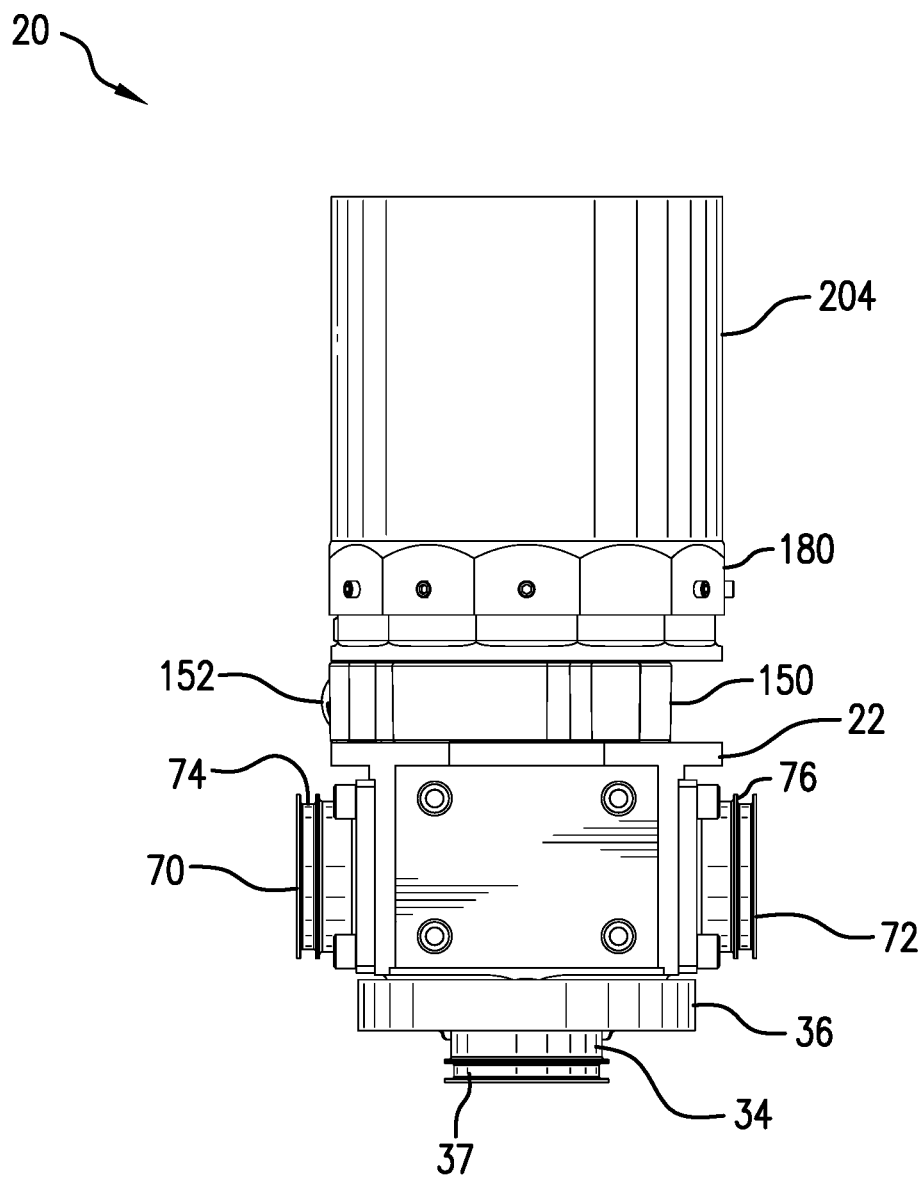
FIG. 4 is a rear elevational view of the valve assembly.
Figure 10:
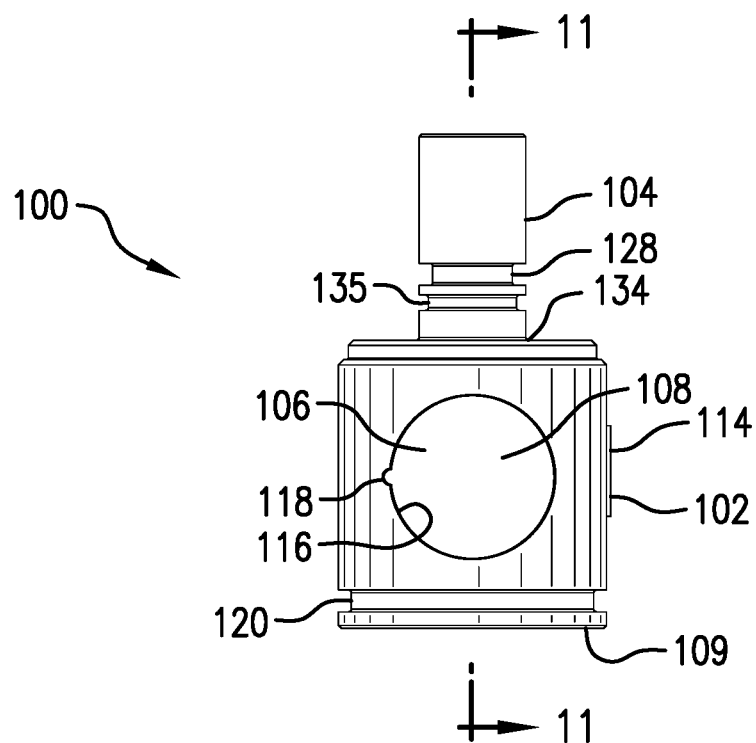
FIG. 10 is a front elevational view of a valve element shown in FIG. 2.
Figure 11:
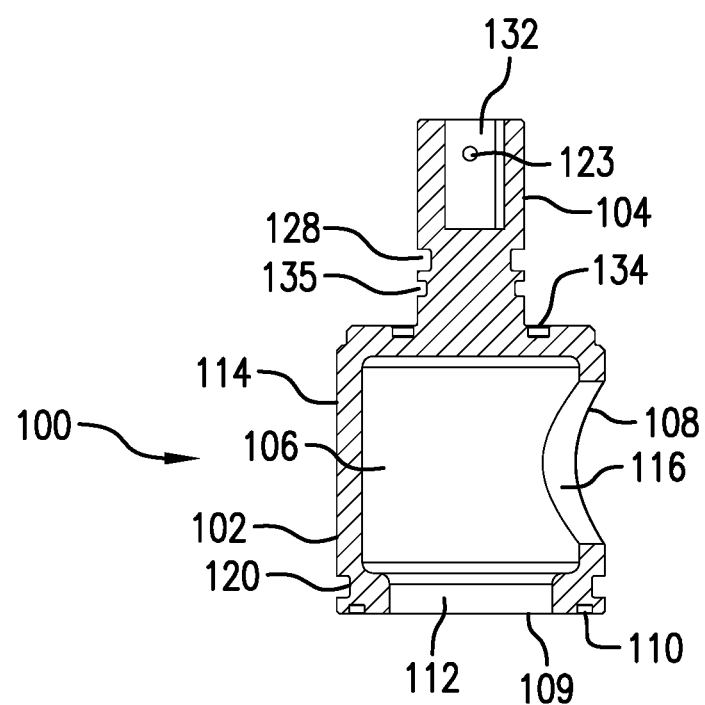
FIG. 11 is a cross-sectional view taken along line 11-11 of FIG. 10.

Referring to FIGS. 2, 10 and 11, valve assembly 20 further comprises rotatable valve element 100. Valve element 100 comprises first portion 102 disposed within interior region 47 of sleeve 40 and second portion 104 that is attached to first portion 102. A portion of second portion 104 extends from and is external to valve body 22. First portion 102 has a generally cylindrical or drum shape. Hereinafter, first portion 102 is referred to as "drum 102". Drum 102 includes interior region 106, a side opening 108, which is in communication with interior region 106, and a bottom end 109. Bottom end 109 defines groove 110 that is sized for receiving seal 111. In an exemplary embodiment, seal 111 is an elastomeric "O" ring seal. End 109 also has opening 112 that is in communication with interior region 106 and valve body inlet 32. Opening 112 is constantly in communication with valve body inlet 32 as valve element 100 rotates. Valve element 100 is rotatable to a first position in which opening 108 is in communication with one port (e.g. port 70) and to a second position in which opening 108 is in communication with the other port (e.g. port 72). For example, if valve element 100 is rotated to a first position such that side opening 108 is in communication with port 70, a media flow path is created that allows media to flow from valve body inlet 32 and into interior region 106 of drum 102 and then out through side opening 108 and into port 70. Similarly, if valve element 100 is rotated to a second position such that side opening 108 is in communication with port 72, a media flow path is created that allows media to flow from valve body inlet 32 and into interior region 106 of drum 102 and then out through side opening 108 and into port 72.

As valve element 100 rotates, exterior surface 114 of drum 102 contacts the portions of the seals that extend into interior region 47 of sleeve 40. For example, referring to FIG. 9B, as valve element 100 rotates, exterior surface 114 is in constant contact with seal portion 92A of seal 92. As a result of this configuration, portion 92A of seal 92 functions as a wiper that wipes FOD off of the exterior surface 114 of drum 102 as valve element 100 rotates. The protruding portion of the other seal (not shown) that is positioned in the substantially half dovetail shaped groove formed at the other sleeve sidewall opening 64 also contacts exterior surface 114 as valve element 100 rotates thereby functioning as another wiper that wipes FOD off of exterior surface 114. The substantially half dovetail shaped grooves and corresponding "O" rings seals disposed therein result in only minimal "unswept volume" since there is only minimal area for the accumulation of FOD in the seal area. The substantially half dovetail shaped grooves provide for a controlled squeeze of the seals and hold the seals in place for easy assembly and operation of valve assembly 20. The shape and configuration of drum 102 also minimize any "unswept volume" and hence, minimize the accumulation of FOD. Drum 102 is shaped and configured for unidirectional rotation. It has been found that such unidirectional rotation of drum 102 drives any FOD out of the seal area thereby protecting the seals in the substantially half dovetail shaped grooves.

The "O" ring seals (e.g. seal 92) that are disposed in the substantially half dovetail shaped grooves are elastomeric instead of plastic. It has been found that, unlike plastic seals, elastomeric seals do not become embedded with FOD and do not scratch exterior surface 114 of drum 102.

Referring to FIGS. 10 and 11, side opening 108 has perimetrical edge 116. Notch 118 is formed in perimetrical edge 116. Notch 118 functions as a bleed port when valve element 100 is rotated to a predetermined position. This feature is described in detail in the ensuing description. Drum 102 includes circumferentially extending groove 120 that is sized to receive bushing 122 (see FIG. 2). Bushing 122 is configured to contact interior surface 46 of sleeve 40 as valve element 100 rotates so as to prevent drum 102 from directly contacting interior surface 46. Bushing 122 prevents wear and damage to valve element 100 and interior surface 46 of sleeve 40. In an exemplary embodiment, bushing 122 is a Rulon-J split bushing. Second portion 104 of valve element 100 comprises a generally cylindrical shaft as shown in FIGS. 10 and 11. Second portion 104 is hereinafter referred to as "shaft 104". Shaft 104 has slip-fit hole 123, the purpose of which is described in the ensuing description. Upper portion 23 of valve body 22 includes generally cylindrical neck portion 124. Neck portion 124 defines vertically oriented passage 125 (see FIGS. 7A and 7B). Neck portion 124 has an interior surface 126 surrounding passage 125. Shaft 104 extends through passage 125. Shaft 104 includes circumferentially extending groove 128 that is sized to receive bushing 130 (see FIG. 2). Bushing 130 is configured to contact interior surface 126 of neck portion 124 as valve element 100 rotates so as to prevent shaft 104 from directly contacting interior surface 126. Bushing 130 prevents wear and damage to shaft 104 and interior surface 126. In an exemplary embodiment, bushing 130 is a Rulon-J split bushing. Unlike roller element bearings, which are typically used in prior art valves, bushings 122 and 130 are significantly less vulnerable to debris, do not experience difficulty rotating and allow for lower actuator loads.

As shown in FIG. 11, shaft 104 includes bore 132 which is configured to have a keyway configuration for engaging motor shaft 202 of motor shaft 200 which are described in detail in the ensuing description. As shown in FIGS. 1 and 10, thrust washer 134 is fitted over shaft 104 and prevents drum 102 from rubbing against the upper portion of interior surface 26 of valve body 22. Shaft 104 includes groove 135 that is sized to receive seal 136. In an exemplary embodiment, seal 136 is an elastomeric "O" ring seal.

Valve element 100 is fabricated from a corrosion-resistant metal. Suitable corrosion-resistant metals include, but are not limited to, Aluminum, stainless steel, Titanium and Nickel. Such corrosion-resistant metals may be treated with protective coatings to provide further corrosion resistance.

In an exemplary embodiment, valve element 100 is fabricated from Aluminum having electroless nickel plating and a Teflon coating.

As shown in FIGS. 7A, 7B and 7C, valve body 22 further comprises a plurality of protruding standoffs 140 on upper portion 23. Each protruding standoff 140 has a threaded inlet 142. In an exemplary embodiment, there are three equidistantly spaced protruding standoffs 140. However, it is to be understood that there may be more than or less than three protruding standoffs 140. In an exemplary embodiment, protruding standoffs 140 are integral with valve body 22. The purpose of protruding standoffs 140 is described in the ensuing description.

Referring to FIGS. 1-4, valve assembly 20 further comprises an actuator assembly that is coupled to shaft 104 of valve element 100 and configured to rotate valve element 100 and determine the position of valve element 100 with respect to ports 70 and 72. The actuator assembly comprises a position sensor assembly that is mounted on top of valve body 22. The position sensor assembly comprises position sensor 150. Position sensor 150 has a centrally located through-hole sized to receive neck 124 of valve body 22 and a plurality of through-holes (not shown) for receiving protruding standoffs 140. Position sensor 150 includes electrical signal connector 152. Position sensor 150 outputs electrical signals via electrical signal connector 152. The electrical signals are representative of the current position of valve element 100. Position sensor 150 may be any suitable commercially available position sensor. In an exemplary embodiment, position sensor 150 is the commercially available Honeywell Model No. SPS-R360D-NBMS0101 SMART position sensor. The position sensor assembly further comprises magnet collar 160 which sits upon position sensor 150 and is attached to shaft 104 of valve element 100 so that magnet collar 160 rotates with valve element 100. Magnet collar 160 comprises non-magnetic half 162 and magnetic half 164. The non-magnetic half 162 is attached to shaft 104 via dowel pin 165 (see FIG. 2) which is inserted into slip-fit cavity 123 in shaft 104. The magnetic half 164 is then attached to non-magnetic half 162 via suitable fasteners (e.g. screws, bolts, etc.) Position sensor 150 senses the position of the magnetic half of magnet collar 160 in a range of 0° to 360°. As a result of this configuration, position sensor 150 senses whether side opening 108 of drum 102 is aligned with port 70 or port 72. In an exemplary embodiment, magnet collar 160 is the commercially available Honeywell SPS-MAG-002 Magnet Collar.

Referring to FIGS. 1-4, the actuator assembly further comprises motor support member 180 which supports controller circuit 190 and motor 200 which are described in the ensuing description. Motor support member 180 is positioned above magnet collar 160. Motor support member 180 includes centrally located opening 186. Opening 186 is sized to allow motor shaft 202 to extend therethrough. Controller circuit 190 comprises circuit board 192 to which are attached various electronic components including electrical signal connector 196, microcontroller circuits, signal buffer circuits and other electrical components. Controller circuit 190 receives signals from position sensor 150 which are representative of the position or orientation of valve element 100 and transfers such signals to external control equipment (not shown). Controller circuit 190 includes wire harness 197 and electrical signal connector 198. Wire harness 197 contains electrical wires that are electrically connected to electrical signal connector 198. Electrical signal connector 198 is connected to electrical signal connector 152 on position sensor 150. Controller circuit 190 also receives electrical signals from the aforementioned external control equipment which represent a desired position of valve element 100. Circuit board 192 has a centrally located opening therein that is aligned with centrally located opening 186 in motor support member 180 and is sized to allow rotatable motor shaft 202 to extend therethrough. In an exemplary embodiment, motor support member 180 and circuit board 192 are attached to standoff bolts 199 that are screwed into threaded inlets 142 of protruding standoffs 140 of valve body 22 (see FIGS. 2 and 7B).

Motor 200 is attached to motor support member 180 such that rotatable motor shaft 202 extends through central opening 186 in motor support member 180 and through central opening 198 in circuit board 192 and into bore 132 of shaft 104. As described in the foregoing description and shown in FIG. 2, shaft 104 of valve 100 extends through neck portion 124 and through magnet collar 160. Motor shaft 202 has a portion thereof that is configured to have a structure that is complementary to the keyway configuration of bore 132 thereby enabling motor shaft 202 to be locked to shaft 104. As a result of this configuration, rotation of motor shaft 202 causes rotation of valve element 100. Motor 200 may be any suitable commercially available motor. In an exemplary embodiment, motor 200 is a Maxon EC 45 Flat 042.9 mm, Brushless, 30 Watt Motor (Part No. 400527), assembled with a Maxon Planetary Gear Box (Part No. 203139). The actuator assembly includes cover 204 that is attached to motor support member 180 via fasteners 206.

In an exemplary embodiment, controller circuit 190 is programmable to output electrical signals to motor 200 that cause motor shaft 202 to rotate 360° in one direction (i.e. unidirectional) and in 180° increments. As a result of this configuration, rotatable motor shaft 202 always rotates in the same direction (e.g. clockwise). For example, if valve element 100 is currently positioned so as to create a media flow path from valve body inlet 132 to port 70 and it is desired to position valve element 100 so as to create a media flow path from valve body inlet 132 to port 72, then controller circuit 190 outputs electrical signals to motor 200 to cause motor shaft 202 to rotate valve element 100 clockwise 180° in order to create the media flow path from valve body inlet 32 to port 72. If it is desired to once again to create a media flow path from valve body inlet 32 to port 70, then controller circuit 190 outputs electrical signals to motor 200 to cause motor shaft 202 to rotate valve element 100 clockwise 180° in order to create the media flow path from valve body inlet 32 to port 70. It is to be understood that "clockwise" direction is being used as an example. Controller circuit 190 is also configurable to output electrical signals to motor 200 to cause motor shaft 202 to rotate only in the counter-clockwise direction. Rotating valve element 100 in only one direction, and not back and forth as is done in prior art valves, prevents valve element 100 from grinding the FOD into the valve seals which would damage these seals. When controller circuit 190 is used in a closed loop system, controller circuit 190 is programmed to cause rotation of valve element 100 only when the system is fully depressurized so as to minimize seal damage.

In an exemplary embodiment, controller circuit 190 is programmed to generate electrical signals that cause motor 200 to rotate valve element 100 for only a predetermined number of degrees so that only notch 118 of drum 102 (see FIG. 10) is in communication with either valve body outlet 28 or valve body outlet 30 and the remaining portion of side opening 108 of drum 102 confronts interior surface 47 of sleeve 40. Such a configuration allows notch 118 to function as a bleed port that provides for slow re-pressurization and also reduces generation of FOD. The precise position of notch 118 (i.e. the "bleed port") is programmed into controller circuit 190. Pressure feedback is then used to control the rate at which side opening 108 becomes entirely opened. For example, the "bleed port" may be used in the aforementioned Carbon Dioxide Removal Assembly (CDRA) on the International Space Station. CDRA utilizes beds of porous clay pellets having embedded zeolite. The bleed port function provided by notch 118 allows for slow re-pressurization of these beds of clay pellets thereby preventing fluidization of the beds and eliminating or substantially reducing debris generation.

The present invention has many applications in the aerospace, manufacturing, chemical and agriculture industries. Examples include, but are not limited to, commercial air desiccant dryer towers, feed mills, dry Portland cement mills and fertilizer production.

Reference in the specification to "an exemplary embodiment", "one embodiment" or "an embodiment" means that a particular feature, structure or characteristic described in connection with the embodiment is included in at least one embodiment of the invention. The appearances of the phrases "an exemplary embodiment", "one embodiment" or "an embodiment" in various places in the specification are not necessarily all referring to the same embodiment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A valve assembly comprising:
    a valve body comprising an interior region, an interior surface extending about the interior region and a pair of valve body outlets in communication with the interior region, wherein each valve body outlet has a first diameter, the valve body including a valve body inlet in communication with the interior region;
    a substantially cylindrical sleeve disposed within the interior region of the valve body and secured to the valve body such that the sleeve is stationary, the sleeve comprising a sidewall having a sleeve exterior surface that contacts the interior surface of the valve body and a sleeve interior surface, the sleeve having a pair of open ends and a pair of sleeve sidewall openings, each sleeve sidewall opening having an angled perimetrical edge and being aligned with a corresponding valve body outlet, each sleeve sidewall opening having a second diameter that is larger than the first diameter such that a portion of the interior surface of the valve body is adjacent to the angled perimetrical edge of the sleeve sidewall opening;
    a pair of ports attached to the valve body, each port having a portion configured for connection to a corresponding external conduit and including a generally tubular portion positioned within a corresponding valve body outlet and sleeve sidewall opening;
    wherein the generally tubular portion of each port, the angled perimetrical edge of the sleeve sidewall opening corresponding to the port and the interior surface of the valve body cooperate to form a groove; and
    a seal lodged within the groove so as to form a seal.

2. The valve assembly according to claim 1 wherein the groove has a substantially half dovetail shape.

3. The valve assembly according to claim 1 wherein the seal is configured so that a portion of the seal extends into the interior region of the sleeve.

4. The valve assembly according to claim 3 further comprising a rotatable valve element to direct the flow of media, the rotatable valve element having an exterior surface that contacts the portion of the seal that extends into the interior region of the sleeve such that the portion of the seal wipes debris and foreign particles off the exterior surface of the valve element as the valve element rotates.

5. The valve assembly according to claim 4 wherein the rotatable valve element comprises a first portion disposed within the interior region of the sleeve and a second portion attached to the first portion and external to the interior region of the sleeve.

6. The valve assembly according to claim 4 wherein the rotatable valve element comprises a first portion disposed within the interior region of the sleeve and a second portion attached to the first portion and external to the interior region of the sleeve, wherein the first portion of the valve element comprises has an interior region, a side opening in communication with the interior region of the first portion and an open end that is in communication with the valve body inlet, wherein the side opening of the first portion is aligned with the one port when the valve element is in the first position and aligned with the another port when the valve element is in the second position.

7. The valve assembly according to claim 6 wherein the side opening of the valve element has a perimetrical edge that defines a notch that functions as a bleed port when the valve element is rotated to a predetermined position.

8. The valve assembly according to claim 1 further comprising a rotatable valve element to control the direction of media flow, the rotatable valve element being rotatable to a first position to create a media flow path from the valve body inlet to one of the ports and to a second position to create a media flow path from the valve body inlet to another of the ports.

9. The valve assembly according to claim 8 wherein the valve element has at least one circumferentially extending groove and a bushing disposed in the circumferentially extending groove, the bushing being configured to contact the interior surface of the sleeve as the valve element rotates and prevent the valve element from directly contacting the interior surface of the sleeve.

10. The valve assembly according to claim 8 wherein the first portion of the rotatable valve element comprises a substantially cylindrical member and the second portion of the rotatable valve element comprises a shaft that is coaxial with and attached to the substantially cylindrical member.

11. The valve assembly according to claim 10 wherein the valve body has an exterior surface and further comprises a generally cylindrical neck portion that extends from the exterior surface of the valve body and defines a passage that is in communication with the interior region of the valve body, wherein the shaft extends through the passage in the neck portion and has a portion that protrudes outside of the neck portion.

12. The valve assembly according to claim 8 further comprising an actuator assembly coupled to the rotatable valve element for rotating the rotatable valve element.

13. The valve assembly according to claim 12 wherein the actuator assembly comprises:

an electric motor having a rotatable motor shaft coupled to the valve element, the electric motor being configured to receive control signals representative of a desired position of the valve element and, in response, rotate the valve element to the desired position;

a position sensor device to provide signals representative of a current position of the valve element; and a controller circuit configured to receive signals provided by the position sensor device and receive signals from an external source that are representative of the desired position of the valve element, wherein the controller circuit is configured to provide control signals to the electric motor to cause the electric motor to rotate the valve element to the desired position in response to receiving the signals from the external source.

14. The valve assembly according to claim 13 wherein the controller circuit is configured to provide control signals to the motor that cause unidirectional rotation of the valve element.

15. The valve assembly according to claim 13 wherein the valve element has a side opening that is aligned with the one port when the valve element is rotated to the first position and aligned with the another port when the valve element is rotated to the second position, the side opening of the valve element having a perimetrical edge that defines a notch that functions as a bleed port when the valve element is rotated to a predetermined position.

16. The valve assembly according to claim 15 wherein the controller circuit is configured to provide control signals to the motor to cause rotation of the valve element to the predetermined position so that only the notch is in communication with one of the ports and the remaining portion of the side opening in the valve element faces the interior surface of the sleeve.

17. The valve assembly according to claim 1 wherein the valve body outlets are coaxially aligned.

18. The valve assembly according to claim 1 further comprising a common port attached to the valve body such that the common port is in communication with the valve body inlet, the common port being configured for connection to an external conduit that provides a flow of media.

19. The valve assembly according to claim 1 wherein the each valve body outlet has a perimetrical edge that defines a groove and the valve body further comprises a pair of valve body outlet seals, wherein each valve body outlet seal is disposed within the groove of the perimetrical edge of a corresponding valve body outlet to form an additional seal between the valve body outlet and the tubular portion of the corresponding port.

20. A valve assembly comprising:

a valve body comprising an interior region, an interior surface extending about the interior region and a pair of valve body outlets in communication with the interior region, wherein each valve body outlet has a first diameter, the valve body including a valve body inlet in communication with the interior region;

a substantially cylindrical sleeve disposed within the interior region of the valve body and secured to the valve body such that the sleeve is stationary, the sleeve comprising a sidewall having a sleeve exterior surface that contacts the interior surface of the valve body and a sleeve interior surface, the sleeve having a pair of open ends and a pair of sleeve sidewall openings, each sleeve sidewall opening having an angled perimetrical edge and being aligned with a corresponding valve body outlet, each sleeve sidewall opening having a second diameter that is larger than the first diameter such that a portion of the interior surface of the valve body is adjacent to the angled perimetrical edge of the sleeve sidewall opening;

a pair of ports attached to the valve body, each port having a portion configured for connection to a corresponding external conduit and including a generally tubular portion positioned within a corresponding valve body outlet and sleeve sidewall opening;

wherein the generally tubular portion of each port, the angled perimetrical edge of the sleeve sidewall opening corresponding to the port and the interior surface of the valve body cooperate to form a groove having a substantially half dovetail shape;

a seal member disposed within the groove and configured so that a portion of the seal extends into the interior region of the sleeve;

a rotatable valve element to direct the flow of media, the rotatable valve element having an exterior surface that contacts the portion of the seal that extends into the interior region of the sleeve such that the portion of the seal wipes debris and foreign particles off the exterior surface of the valve element as the valve element rotates, the rotatable valve element being rotatable to a first position to create a media flow path from the valve body inlet to one of the ports and to a second position to create a media flow path from the valve body inlet to another of the ports; and an actuator assembly coupled to the rotatable valve element for rotating the rotatable valve element.

* * * * *